United States Patent [19]
Park et al.

[11] Patent Number: 5,688,732
[45] Date of Patent: Nov. 18, 1997

[54] DIELECTRIC CERAMIC COMPOSITIONS FOR MICROWAVE

[75] Inventors: Jung-Rae Park; Tae-Hong Kim; Suk-Jin Lee; Sang-Seok Lee; Tae-Goo Choi, all of Daejeon, Rep. of Korea

[73] Assignee: Electronics & Telecommunications Research Inst., Daejeon, Rep. of Korea

[21] Appl. No.: 559,278

[22] Filed: Nov. 15, 1995

[30] Foreign Application Priority Data

Nov. 16, 1994 [KR] Rep. of Korea ............. 94-30096
Dec. 13, 1994 [KR] Rep. of Korea ............. 94-33906

[51] Int. Cl.$^6$ ............................................. C04B 35/46
[52] U.S. Cl. ..................................... 501/138; 501/139
[58] Field of Search ............................. 501/138, 139

[56] References Cited

U.S. PATENT DOCUMENTS

| | | | |
|---|---|---|---|
| 4,642,732 | 2/1987 | Ikeda et al. | 501/138 |
| 4,713,726 | 12/1987 | Sasazawa | 501/139 |
| 4,960,551 | 10/1990 | Eonomoto et al. | 501/138 |
| 4,968,649 | 11/1990 | Tsurumi et al. | 501/138 |
| 5,116,790 | 5/1992 | Bruno et al. | 501/138 |
| 5,238,673 | 8/1993 | Bruno et al. | 501/138 |
| 5,262,370 | 11/1993 | Negas et al. | 501/138 |
| 5,310,710 | 5/1994 | Takase et al. | 501/139 |

OTHER PUBLICATIONS

Wakino, et al.: "Microwave Characteristics of (Zr,Sn) . . . Dielectric Re-Sonators"; pp. 278–281; Journal of the American Ceramic Society, vol. 67, No. 4 Apr. 1984.

Nishigaki, et al.: "Microwave Dielectric Properties Of . . . Ceramics"; pp. 1405–1410; American Ceram. Soc. Bull., vol. 66; 1987 (no month).

Mercurio, et al.: "Microwave Dielectric Properties Of $BaNd_{2(1-x)}$ . . . "; pp. 112–114; Materials Letters, vol. 8, No. 3,4; May 1989.

Primary Examiner—Deborah Jones
Attorney, Agent, or Firm—Harold L. Novick; Nath & Associates

[57] ABSTRACT

The present invention relates to dielectric ceramic compositions for microwave applications consisting of BaO, PbO, $Nd_2O_3$, $CeO_2$, $La_2O_3$ and $TiO_2$ or consisting of compositions including these elements and having a composition formula (I).

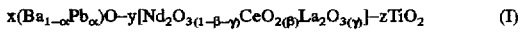

$$x(Ba_{1-\alpha}Pb_{\alpha})O-y[Nd_2O_{3(1-\beta-\gamma)}CeO_{2(\beta)}La_2O_{3(\gamma)}]-zTiO_2 \quad (I)$$

wherein mol %, $6 \leq x \leq 20$, $10 \leq y \leq 20$, $60 \leq z \leq 75$, $x+y+z=100$; and $0 < \alpha \leq 0.5$, $0 \leq \beta \leq 0.2$, $0 \leq \gamma \leq 0.2$ and $0 < 1-\beta-\gamma < 1$. These dielectric ceramic compositions for microwave applications have a dielectric constant above 90 at room temperature, a temperature coefficient at the resonant frequency within +5 ppm/°C, and a quality factor above 5,000 at 1 GHz, they can be used as filters, as resonator dielectrics for microwave applications, as laminated ceramic capacitors, as dielectrics for electromagnetic wave impediment filters and as dielectrics for capacitors. Further, these compositions can reduce the problems of evaporation of lead oxides and bismuth oxides, and thus can reduce the use of elements harmful to human body.

12 Claims, No Drawings

DIELECTRIC CERAMIC COMPOSITIONS FOR MICROWAVE

FIELD OF THE INVENTION

The present invention relates to dielectric ceramic compositions for microwave, especially to dielectric ceramic compositions for microwave having high dielectric constant, low temperature coefficient of resonance frequency and good quality factor (Q).

DESCRIPTION OF THE RELATED ART

Recently, wireless communication means such as car phones, cellular phones, wireless phones and satellite broadcasting receivers are widely used, and thus properties of various elements such microwave circuits and integrated circuits as well as filters for microwave band, substrate and voltage controlled oscillator (VCO) become improved.

Materials used in the above elements for microwave must have large dielectric constant, high quality factor of more than 5,000 at high frequency and low temperature coefficient of ±5 ppm/°C. of resonance frequency. Therefore, elements for microwave form a dielectric ceramic such as $BaO$-$Nd_2O_3$-$TiO_2$ system and $BaO$-$Sm_2O_3$-$TiO_2$ system having high dielectric constant, and make resonator forms. Dielectric ceramics such as the above $BaO$-$Nd_2O_3$-$TiO_2$ system and $BaO$-$Sm_2O_3$-$TiO_2$ system had dielectric constant($\epsilon$) of 60 to 80 and quality factor (Q) of 5,000 at 1 GHz, but had a problem of high temperature coefficient ($\tau_f$) of ±30 ppm/°C. of resonance frequency.

Zunichi Gato, etc., [Japanese Journal of Applied Physics, Vol. 30, No. 9B, pp 2343–2346 (1991. 11)] suggested a $PbO$-$ZrO_2$-$CaO$ system having high dielectric constant. This $PbO$-$ZrO_2$-$CaO$ system had a high dielectric constant of above 90, but had a low quality factor of 1,000 to 3,500 and high loss coefficient at above 3 GHz of high frequency, and thus it had a defect of high parts loss of band pass filters (BPF) and voltage controlled oscillators.

Wakino etc., [Journal of America Ceramic Society, vol. 67, No. 4, pp. 278–281] suggested a composition of $BaO$-$PbO$-$Nd_2O_3$-$TiO_2$ system. This composition of $BaO$-$PbO$-$Nd_2O_3$-$TiO_2$ system which is the composition of $BaO$-$Nd_2O_3$-$TiO_2$ system added PbO, has a composition ratio of 0.5 $BaO$—0.5 $PbO$—1.0 $Nd_2O_3$—5.0 $TiO_2$. Dielectric constant of this $BaO$-$PbO$-$Nd_2O_3$-$TiO_2$ system composition becomes high in degree of 85 to 90 by adding PbO, and quality factor is 4,000 to 5,000.

However, since the composition of $BaO$-$PbO$-$Nd_2O_3$-$TiO_2$ system has a very large composition ratio of PbO and Pb is very volatile, in proportion to the amount of Pb, the evaporated amount becomes large, and thus elements made of this composition do not have uniform composition ratio and can have a fatal effect on human body due to its manufacturing process.

DETAILED DESCRIPTION OF THE INVENTION

Therefore, the purpose of the present invention resides in providing dielectric ceramic compositions for microwave having high dielectric constant and good quality factor at high frequency, and low temperature coefficient of resonance frequency in order to produce devices for microwave.

Other purpose of the present invention resides in providing dielectric ceramic compositions for microwave which can produce devices having uniform composition ratio by reducing a composition ratio of PbO and evaporated amount of harmful Pb.

Dielectric ceramic compositions for microwave according to one Example of the present invention in order to accomplish the above purposes consist of BaO, PbO, $Nd_2O_3$, $CeO_2$, $La_2O_3$ and $TiO_2$ or consist of compounds of these elements and have a composition formula (I).

wherein, 6 mol %$\leq$x$\leq$20 mol %, 10 mol %$\leq$y$\leq$20 mol %, 60 mol %$\leq$z$\leq$75 mol %, x+y+z=100 mol %, 0<$\alpha$$\leq$0.5, 0$\leq$$\beta$$\leq$0.2, 0$\leq$$\gamma$$\leq$0.2 and 0<1-$\beta$-$\gamma$<1.

Dielectric ceramic compositions for microwave according to other Examples of the present invention in order to accomplish the above purposes, consist of BaO, PbO, $Nd_2O_3$, $CeO_2$ and $TiO_2$, or consist of compounds of these elements and include as main component compound of formula (I) and as minor components one or more kinds of oxides selected from the groups consisting of CuO, ZnO, $Bi_2O_3$ and MnO in amount of less than 1 wt %.

wherein, 6 mol %$\leq$x$\leq$20 mol %, 10 mol %$\leq$y$\leq$20 mol %, 60 mol %$\leq$z$\leq$75 mol %, x+y+z=100 mol %, 0<$\alpha$$\leq$0.5 and 0$\leq$$\beta$$\leq$0.2.

Consisting of BaO, PbO, $Nd_2O_3$, $CeO_2$, $La_2O_3$ and $TiO_2$ or by adding as main components BaO, PbO, $Nd_2O_3$, $CeO_2$, $La_2O_3$ and $TiO_2$ and one or more kinds of CuO, ZnO, $Bi_2O_3$ and MnO as minor components selectively, dielectric ceramic compositions, which have high dielectric constant and quality factor at high frequency and low temperature coefficient of resonance frequency, and thus can produce elements for microwave, can be obtained.

Examples

The above given main components or the main components and the given minor components weighed in plastic container, and mixed with deionized water in ball milling method. After evaporating the deionized water, powder dried. By calcinating the dried powder for two hours in high temperature of above 1,000° C., made crystal structure, added a proper amount of polyvinyl alcohol and mixed in Zirconia induction. And then, this mixed material molded as a cylindrical test piece of 10 mm diameter and 5 mm height by using mold and hydraulic press and sintered on the Zirconia setter in electric furnace. Molding carried out in above 1.0 ton/cm² pressure, and sintering carried out in high temperature of 1,250° to 1,400° C. for 2 to 4 hours in air atmosphere.

Dielectric constant and quality factor of a test specimen made by above process was measured and temperature coefficient of resonance frequency was calculated. Dielectric constant measured by Hakki-Coleman method at high frequency of 3 GHz was above 90, and quality factor measured by open resonator method in unloaded test specimen at 1 GHz was above 4,500.

Calculated by the following formula, temperature coefficient of resonance frequency ($\tau_f$) was within about ±10 ppm/°C. in temperature range of 25° to 125° C. on the basis of resonance frequency at 25° C.

$$\tau_f = \frac{f(125) - f(25)}{f(25)} \times \frac{1}{\Delta T} \text{ (ppm/°C.)}$$

wherein, f(125) is the resonance frequency at 125° C.

f(25) is the resonance frequency at 25° C.

f(25) and f(125) are a little different according to each of test specimens in center of 3 GHz, and ΔT is the difference between measuring temperatures, in the case of the above formula, ΔT=125° C.−25° C.=100° C.

It is clear that as increasing the composition ratio of $TiO_2$, optimum sintering temperature lowered, and quality factor increased. However, when the composition ratio of $TiO_2$ is more than 75 mol %, since temperature coefficient of resonance frequency shifts to positive (+) direction greatly, it is difficult to practise. Also, when the composition ratio of $TiO_2$ is less than 60 mol %, dielectric does not form. As the amount of $Nd_2O_3$ in composition increases, quality factor increases and sintering temperature increases above 1,400° C. When more than 20 mol %, temperature coefficient of resonance frequency shifts to positive direction; when less than 6 mol %, relatively the composition ratio of $TiO_2$ increases, and thus temperature coefficient of resonance frequency shifts to positive direction.

As the composition ratio of BaO increases, quality factor lowers and temperature coefficient of resonance frequency is stabilized. And, as the composition ratio of PbO increases, optimum sintering temperature lowers and dielectric constant increases. However, when more than 50 mol %, due to evaporation of Pb, it is difficult to control composition and quality coefficient lowers abruptly. Also, as composition ratios of $CeO_2$ and $La_2O_3$ in compositions increases dielectric constant and quality factor increase; optimum sintering temperature lowers; and temperature coefficient of resonance frequency shifts to positive direction. When selectively adding one or more kinds of minor components consisting of CuO, ZnO, $Bi_2O_3$ and MnO to the compositions in excess amount, dielectric constant increases; temperature coefficient of resonance frequency shifts to 0 ppm/°C.; and sintering temperature lowers.

In the above compositions, $BaCO_3$ instead of BaO, $Pb_3O_4$ instead of PbO can be used. Even though carbon component evaporates, $BaCO_3$ do not change dielectric property greatly; $Pb_3O_4$ renders each of compositions mixed uniformly, and do not change dielectric property greatly.

When sintering temperature increases at the same composition, dielectric constant and quality factor increase a little; when sintering temperature lengthens, dielectric constant changes little and quality factor increases a little.

Table 1 shows dielectric properties of dielectric ceramics according to the Examples of compositions of the present invention, dielectric constant, quality factor and temperature coefficient of resonance frequency of dielectric ceramic compositions having a composition formula

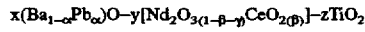

$x(Ba_{1-\alpha}Pb_\alpha)O-y[Nd_2O_{3(1-\beta-\eta)}CeO_{2(\beta)}]-zTiO_2$ which obtained by using BaO, PbO, $Nd_2O_3$, $CeO_2$ and $TiO_2$ as components by the above method.

The composition formula is the composition that a given amount, i.e., β of $CeO_2$ is added instead of $Nd_2O_3$. In the formula, 6 mol %≤x≤20 mol %, 10 mol %≤y≤20 mol %, 60 mol %≤z≤75 mol %, x+y+z=100 mol %, 0<α≤0.5 and 0≤β≤0.2.

Table 2 shows dielectric constant, quality factor and temperature coefficient of resonance frequency of dielectric ceramics of comparative examples which deviate from composition of Examples of the present invention. As seen in Table 2, when composition ratio of BaO is 35.0 mol %, dielectric constant of dielectric ceramics of comparative Examples increases to 141.4, but quality factor lowers greatly to 1004, and temperature coefficient shifts to negative direction of −174 ppm/°C. greatly.

When composition ratio of $Nd_2O_3$ is 22.4 mol %, quality factor increases to 6300; but dielectric constant decreases to 68, and sintering temperature increases to 1,475° C. Also, composition ratio of $TiO_2$ is 75.6 mol %, dielectric constant decreases to 2,460, and temperature coefficient shifts to positive direction of +150 ppm/°C. greatly.

As seen in Table 1 and Table 2, one or more properties among dielectric constant, quality factor and temperature coefficient of dielectric ceramics of comparative Examples are inferior to those of dielectric ceramics according to the compositions of the present invention.

Table 3 shows dielectric properties of dielectric ceramics according to the other Examples of compositions of the present invention, dielectric constant, quality factor an temperature coefficient of resonance frequency of dielectric ceramic compositions having a composition formula of $x(Ba_{1-\alpha}Pb_\alpha)O-y[Nd_2O_{3(1-\gamma)}La_2O_{3(\gamma)}]-zTiO_2$, which obtained by using BaO, PbO, $Nd_2O_3$, $La_2O_3$ and $TiO_2$ as components by the above method. The composition formula is the composition that a given amount, i.e., γ of $La_2O_3$ is added instead of $Nd_2O_3$. In the formula, 6 mol %≤x≤20 mol %, 10 mol %≤y≤20 mol %, 60 mol %≤z≤75 mol %, x+y+z=100 mol %, 0<α≤0.5 and 0≤γ≤0.2.

Table 4 shows dielectric constant, quality factor and temperature coefficient of resonance frequency of dielectric ceramics of comparative Examples which deviate from composition of other Examples of the present invention. As seen in Table 4, when composition ratio of BaO is 35.0 mol %, dielectric constant increases to 160.4, but quality factor lowers greatly to 986, and temperature coefficient shifts to negative direction of −157 ppm/°C. greatly.

When composition ratio of $Nd_2O_3$ is 22.4 mol %, quality factor increases to 6150; dielectric constant decreases to 64, and sintering temperature increases to 1,450° C. Also, composition ratio of $TiO_2$ is 75.6 mol %, dielectric constant decreases to 2460, and temperature coefficient shifts to positive direction of +168 ppm/°C. greatly.

As seen in Table 3 and 4, one or more properties among dielectric constant, quality factor and temperature coefficient of dielectric ceramics of comparative Examples are inferior to those of dielectric ceramics according to the compositions of the present invention.

Table 5 shows dielectric properties of dielectric ceramics according to another Examples of compositions of the present invention, dielectric constant, quality factor and temperature coefficient of resonance frequency of dielectric ceramic compositions having a composition formula of

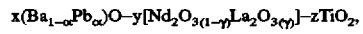

$x(Ba_{1-\alpha}Pb_\alpha)O-y[Nd_2O_{3(1-\gamma)}La_2O_{3(\gamma)}]-zTiO_2$, which obtained by using BaO, PbO, $Nd_2O_3$, $La_2O_3$ and $TiO_2$ as components by the above method. The composition formula is the composition that a given amount, i.e., β of $CeO_2$ and γ of $La_2O_3$ are added instead of $Nd_2O_3$.

In the formula, 6 mol %≤x≤20 mol %, 10 mol %≤y≤20 mol %, 60 mol %≤z≤75 mol %, x+y+z=100 mol %, 0<α≤0.5, 0≤β≤0.2, 0≤γ≤0.2 and 0<1−β−γ<1.

Table 6 shows dielectric constant, quality factor and temperature coefficient of resonance frequency of dielectric ceramics of comparative Examples which deviate from composition of another Examples of the present invention. As seen in Table 6, when composition ratio of BaO is 35.0 mol %, dielectric constant increases to 136.2, but quality factor lowers greatly to 1,004, and temperature coefficient shifts to negative direction of −174 ppm/°C. greatly.

When composition ratio of $Nd_2O_3$ is 22.4 mol %, quality factor increases to 5,980 which is greater than that of the present invention; dielectric constant decreases to 60.5, and sintering temperature increases to 1,475° C. Also, composition ratio of $TiO_2$ is 75.6 mol %, dielectric constant decreases to 2,460, and temperature coefficient shifts to positive direction of +150 ppm/°C. greatly.

As seen in Table 5 and Table 6, one or more properties among dielectric constant, quality factor and temperature coefficient of dielectric ceramics of comparative Examples are inferior to those of dielectric ceramics according to the compositions of the present invention.

Table 7 shows dielectric properties of dielectric ceramics according to another Examples of composition of the present invention, dielectric constant, quality factor and temperature coefficient of resonance frequency of dielectric ceramic compositions having a composition formula of $x(Ba_{1-\alpha}Pb_\alpha)$ $O-y[Nd_2O_{3(1-\beta)} CeO_{2(\beta)}]-zTiO_2$, which obtained by using BaO, PbO, $Nd_2O_3$, $CeO_2$ and $TiO_2$ as main components and selectively using one or more kinds of CuO, ZnO, $Bi_2O_3$ and MnO as minor components by the above method.

In the formula, 6 mol % $\leq x \leq$ 20 mol %, 10 mol % $\leq y \leq$ 20 mol %, 60 mol % $\leq z \leq$ 75 mol %, x+y+z=100 mol %, $0 < \alpha \leq 0.5$ and $0 \leq \beta \leq 0.2$, and minor components selected one or more kinds from the group consisting of CuO, ZnO, $Bi_2O_3$ and MnO are added excessively in amount of greater than 0 wt % and less than 1.0 wt %.

Table 8 shows dielectric constant, quality factor and temperature coefficient of resonance frequency of dielectric ceramics of comparative Examples which deviate from composition of another examples of the present invention. As seen in Table 8, when minor components of CuO, ZnO, $Bi_2O_3$ and MnO become greater than 1 wt %, dielectric constant of dielectric ceramics of comparative examples is about 80 to 86 and quality factor is about 2,800 to 3,900 which are smaller than those of dielectric ceramics according to another Examples of the present invention.

Thus, since dielectric ceramic compositions for microwave according to the present invention have above 90 of dielectric constant at room temperature, ±5 ppm/°C. of temperature coefficient of resonance frequency and above 5,000 of quality factor at 1 GHz, they can be used as filter for microwave, resonator dielectrics, laminated ceramic capacitor, dielectrics for electromagnetic waves impediment filter and dielectrics for capacitor. Also, dielectric ceramic compositions of the present invention can reduce the problems of evaporation of Lead Oxides and Bismuth Oxides, and can reduce the use of harmful elements to human body.

TABLE 1

| Sample No. | Main components (mol %) (x + y + z = 100) | | | | | | Sintering Cnd. | | DC | QF | $\tau_f$ |
|---|---|---|---|---|---|---|---|---|---|---|---|
| | x | y | z | α | β | γ | Tp(°C.) | Time (h) | ε | Q × f | (ppm/°C.) |
| 1 | 16.6 | 16.7 | 66.7 | 0.50 | 0.15 | 0 | 1350 | 2 | 97.1 | 5441 | −1.6 |
| 2 | 16.7 | 16.6 | 66.7 | 0.50 | 0.10 | 0 | 1350 | 2 | 95.9 | 5448 | −3.6 |
| 3 | 16.7 | 16.6 | 66.7 | 0.50 | 0.20 | 0 | 1350 | 2 | 97.5 | 5389 | +1.3 |
| 4 | 6.6 | 19.7 | 73.7 | 0.40 | 0.15 | 0 | 1250 | 3 | 96.4 | 5150 | +4.8 |
| 5 | 14.2 | 15.4 | 70.4 | 0.45 | 0.20 | 0 | 1275 | 4 | 95.1 | 5510 | +2.1 |
| 6 | 16.6 | 16.7 | 66.7 | 0.50 | 0.20 | 0 | 1325 | 2 | 96.5 | 5353 | +1.1 |
| 7 | 16.6 | 16.7 | 66.7 | 0.50 | 0.05 | 0 | 1325 | 2 | 95.2 | 5346 | −7.6 |
| 8 | 11.4 | 18.5 | 70.1 | 0.35 | 0.10 | 0 | 1300 | 2 | 96.8 | 5450 | −4.3 |
| 9 | 16.7 | 16.6 | 66.7 | 0.50 | 0.10 | 0 | 1375 | 2 | 95.4 | 5451 | −1.6 |
| 10 | 16.6 | 16.7 | 66.7 | 0.50 | 0.15 | 0 | 1375 | 2 | 95.8 | 5482 | +4.4 |
| 11 | 19.5 | 10.9 | 69.6 | 0.35 | 0.20 | 0 | 1375 | 4 | 95.3 | 5440 | −2.0 |
| 12 | 16.7 | 16.6 | 66.7 | 0.50 | 0.20 | 0 | 1375 | 2 | 95.7 | 5479 | +8.1 |

Sintering Cnd.: Sintering Conditions
Tp: Temperature
DC: Dielectric Constant
QF: Quality Factor

TABLE 2

| Sample No. | Main components (mol %) (x + y + z = 100) | | | | | | Sintering Cnd. | | DC | QF | $\tau_f$ |
|---|---|---|---|---|---|---|---|---|---|---|---|
| | x | y | z | α | β | γ | Tp(°C.) | Time (h) | ε | Q × f | (ppm/°C.) |
| 1 | 35.0 | 7.0 | 58.0 | 0.50 | 0.20 | 0 | 1350 | 2 | 141.4 | 1004 | −174 |
| 2 | 9.1 | 22.4 | 68.5 | 0.40 | 0.20 | 0 | 1475 | 2 | 68 | 6300 | +83 |
| 3 | 9.4 | 15.0 | 75.6 | 0.45 | 0.15 | 0 | 1350 | 2 | 83.6 | 2460 | +150 |

Sintering Cnd.: Sintering Conditions
Tp: Temperature
DC: Dielectric Constant
QF: Quality Factor

TABLE 3

(x + y + z = 100)

| Sample No. | Main components (mol %) | | | | | | Sintering Cnd. | | DC | QF | $\tau_f$ |
|---|---|---|---|---|---|---|---|---|---|---|---|
| | x | y | z | α | β | γ | Tp(°C.) | Time (h) | ε | Q × f | (ppm/°C.) |
| 1 | 16.6 | 16.7 | 66.7 | 0.50 | 0 | 0.15 | 1350 | 2 | 92.5 | 5704 | +9.7 |
| 2 | 16.7 | 16.6 | 66.7 | 0.50 | 0 | 0.15 | 1350 | 4 | 92.5 | 5902 | +8.1 |
| 3 | 14.5 | 15.5 | 70.0 | 0.35 | 0 | 0.05 | 1350 | 3 | 96.1 | 5620 | −0.8 |
| 4 | 16.6 | 16.7 | 66.7 | 0.50 | 0 | 0.15 | 1375 | 2 | 93.9 | 5589 | +6.8 |
| 5 | 16.7 | 16.6 | 66.7 | 0.40 | 0 | 0.10 | 1375 | 2 | 94.2 | 5503 | +4.7 |
| 6 | 16.6 | 16.7 | 66.7 | 0.25 | 0 | 0.15 | 1350 | 2 | 92.4 | 5487 | +2.3 |
| 7 | 6.4 | 19.8 | 73.8 | 0.45 | 0 | 0.10 | 1300 | 3 | 96.7 | 5638 | +5.8 |
| 8 | 16.6 | 16.7 | 66.7 | 0.30 | 0 | 0.20 | 1350 | 2 | 94.5 | 5620 | +7.6 |
| 9 | 10.8 | 18.5 | 70.7 | 0.25 | 0 | 0.15 | 1300 | 2 | 97.7 | 5395 | −4.1 |
| 10 | 19.5 | 10.7 | 69.8 | 0.45 | 0 | 0.05 | 1250 | 4 | 95.6 | 5843 | −2.8 |
| 11 | 12.5 | 15.8 | 71.7 | 0.40 | 0 | 0.20 | 1375 | 2 | 97.4 | 5340 | +3.6 |
| 12 | 15.2 | 16.9 | 67.9 | 0.35 | 0 | 0.10 | 1300 | 2 | 96.7 | 5620 | −0.8 |

Sintering Cnd.: Sintering Conditions
Tp: Temperature
DC: Dielectric Constant
QF: Quality Factor

TABLE 4

(x + y + z = 100)

| Sample No. | Main components (mol %) | | | | | | Sintering Cnd. | | DC | QF | $\tau_f$ |
|---|---|---|---|---|---|---|---|---|---|---|---|
| | x | y | z | α | β | γ | Tp(°C.) | Time (h) | ε | Q × f | (ppm/°C.) |
| 1 | 35.0 | 7.0 | 58.0 | 0.45 | 0 | 0.20 | 1375 | 2 | 160.4 | 986 | −157 |
| 2 | 9.1 | 22.4 | 68.5 | 0.40 | 0 | 0.10 | 1450 | 2 | 64 | 6150 | +96 |
| 3 | 9.4 | 15.0 | 75.6 | 0.40 | 0 | 0.15 | 1350 | 2 | 84.3 | 2740 | +168 |

Sintering Cnd.: Sintering Conditions
Tp: Temperature
DC: Dielectric Constant
QF: Quality Factor

TABLE 5

(x + y + z = 100)

| Sample No. | Main components (mol %) | | | | | | Sintering Cnd. | | DC | QF | $\tau_f$ |
|---|---|---|---|---|---|---|---|---|---|---|---|
| | x | y | z | α | β | γ | Tp(°C.) | Time (h) | ε | Q × f | (ppm/°C.) |
| 1 | 16.6 | 16.7 | 66.7 | 0.50 | 0.10 | 0.05 | 1325 | 2 | 96.2 | 5375 | +4.6 |
| 2 | 16.7 | 16.6 | 66.7 | 0.50 | 0.05 | 0.10 | 1325 | 2 | 95.0 | 5550 | +9.3 |
| 3 | 19.5 | 10.9 | 69.6 | 0.35 | 0.25 | 0.05 | 1250 | 3 | 95.5 | 5356 | +1.2 |
| 4 | 6.6 | 19.7 | 73.7 | 0.45 | 0.20 | 0.05 | 1275 | 4 | 96.4 | 5730 | +3.7 |
| 5 | 12.4 | 14.9 | 72.7 | 0.40 | 0.15 | 0.20 | 1275 | 2 | 96.0 | 5910 | +1.2 |
| 6 | 14.2 | 18.5 | 67.3 | 0.45 | 0.20 | 0.05 | 1300 | 2 | 97.4 | 5900 | +5.4 |
| 7 | 16.6 | 15.4 | 68.0 | 0.50 | 0.10 | 0.05 | 1300 | 2 | 96.2 | 5392 | +3.4 |
| 8 | 16.7 | 16.6 | 66.7 | 0.50 | 0.05 | 0.10 | 1300 | 2 | 95.6 | 5399 | +8.2 |
| 9 | 16.7 | 16.6 | 66.7 | 0.50 | 0.10 | 0.05 | 1275 | 2 | 95.5 | 5068 | +2.3 |
| 10 | 16.6 | 16.7 | 66.7 | 0.50 | 0.05 | 0.10 | 1275 | 2 | 95.0 | 5076 | +6.5 |
| 11 | 15.2 | 16.3 | 68.5 | 0.40 | 0.15 | 0.15 | 1300 | 2 | 95.3 | 5404 | +2.7 |
| 12 | 10.9 | 18.4 | 70.7 | 0.25 | 0.25 | 0.10 | 1275 | 2 | 95.8 | 5504 | −4.7 |

TABLE 6

(x + y + z = 100)

| 시료 번호 | Main components (mol %) | | | | | | Sintering Cnd. | | DC | QF | $\tau_f$ |
|---|---|---|---|---|---|---|---|---|---|---|---|
| | x | y | z | α | β | γ | Tp(°C.) | Time (h) | ε | Q × f | (ppm/°C.) |
| 1 | 35.0 | 7.0 | 58.0 | 0.50 | 0.20 | 0.05 | 1350 | 2 | 136.2 | 1004 | −174 |
| 2 | 9.1 | 22.4 | 68.5 | 0.40 | 0.10 | 0.10 | 1475 | 2 | 60.5 | 5980 | +64 |
| 3 | 9.4 | 15.0 | 75.6 | 0.45 | 0.15 | 0.15 | 1350 | 2 | 81.4 | 2460 | +150 |

TABLE 7

(x + y + x = 100)

| Sample No. | Main components (mol %) | | | | | Minor C. | | Sint. Cnd. | | DC | QF | $\tau_f$ |
|---|---|---|---|---|---|---|---|---|---|---|---|---|
| | x | y | z | α | β | | (wt %) | Tp (°C.) | Time (h) | ε | Q × f | (ppm/°C.) |
| 1 | 16.6 | 16.7 | 66.7 | 0.50 | 0.20 | CuO | 0.5 | 1300 | 2 | 93.9 | 4740 | +0.1 |
| 2 | 16.7 | 16.6 | 66.7 | 0.50 | 0.20 | ZnO | 0.5 | 1300 | 4 | 93.5 | 4845 | +5.1 |
| 3 | 16.7 | 16.6 | 66.7 | 0.50 | 0.10 | $Bi_2O_3$ | 0.5 | 1300 | 2 | 92.3 | 4654 | −2.6 |
| 4 | 16.6 | 16.7 | 66.7 | 0.40 | 0.20 | MnO | 0.5 | 1300 | 2 | 91.3 | 4861 | +0.3 |
| 5 | 14.2 | 15.4 | 70.4 | 0.45 | 0.15 | CuO | 0.9 | 1250 | 2 | 91.7 | 4670 | −2.7 |
| 6 | 16.6 | 16.7 | 66.7 | 0.50 | 0.20 | ZnO | 0.5 | 1275 | 2 | 92.9 | 4819 | +3.6 |
| 7 | 16.6 | 16.7 | 66.7 | 0.50 | 0.05 | $Bi_2O_3$ | 0.4 | 1350 | 2 | 90.4 | 4822 | +5.8 |
| 8 | 12.4 | 17.1 | 70.5 | 0.35 | 0.20 | MnO | 0.2 | 1350 | 4 | 90.6 | 5084 | +6.3 |
| 9 | 16.7 | 16.6 | 66.7 | 0.40 | 0.15 | CuO | 0.6 | 1275 | 2 | 92.7 | 4855 | +1.4 |
| 10 | 16.6 | 16.7 | 66.7 | 0.40 | 0.15 | ZnO | 0.4 | 1325 | 2 | 93.6 | 5154 | +4.9 |
| 11 | 19.5 | 10.9 | 69.6 | 0.35 | 0.20 | $Bi_2O_3$ | 0.6 | 1350 | 2 | 95.8 | 5002 | −3.8 |
| 12 | 16.7 | 16.6 | 66.7 | 0.50 | 0.20 | MnO | 0.7 | 1350 | 2 | 92.5 | 4948 | +5.9 |
| 13 | 16.6 | 16.7 | 66.7 | 0.50 | 0.20 | CuO | 0.5 | 1325 | 2 | 93.2 | 4793 | +2.1 |
| 14 | 16.7 | 16.6 | 66.7 | Q.50 | 0.20 | ZnO | 0.7 | 1325 | 2 | 92.5 | 4934 | +4.6 |
| 15 | 16.7 | 16.6 | 66.7 | 0.50 | 0.10 | $Bi_2O_3$ | 0.5 | 1325 | 2 | 94.5 | 4859 | −2.4 |
| 16 | 6.6 | 19.7 | 73.7 | 0.40 | 0.20 | MnO | 0.5 | 1325 | 2 | 94.7 | 4959 | +4.8 |
| 17 | 16.6 | 16.7 | 66.7 | 0.50 | 0.20 | CuO | 0.3 | 1300 | 4 | 94.7 | 4740 | +2.5 |
| 18 | 16.6 | 16.7 | 66.7 | 0.50 | 0.15 | ZnO | 0.6 | 1275 | 2 | 90.6 | 5254 | +3.6 |
| 19 | 19.5 | 10.9 | 69.6 | 0.35 | 0.20 | $Bi_2O_3$ | 0.3 | 1300 | 4 | 94.6 | 4986 | −2.1 |
| 20 | 12.4 | 17.5 | 70.1 | 0.35 | 0.15 | MnO | 0.3 | 1275 | 2 | 92.6 | 5084 | +6.4 |
| 21 | 16.6 | 16.7 | 66.7 | 0.45 | 0.20 | CuO | 0.8 | 1250 | 2 | 92.5 | 4698 | −1.4 |
| 22 | 16.7 | 16.6 | 66.7 | 0.50 | 0.20 | ZnO | 0.8 | 1250 | 2 | 93.5 | 4863 | +5.9 |
| 23 | 16.7 | 16.6 | 66.7 | 0.45 | 0.15 | $Bi_2O_3$ | 0.8 | 1250 | 4 | 92.3 | 4667 | −2.6 |
| 24 | 6.6 | 19.7 | 73.7 | 0.40 | 0.20 | MnO | 0.8 | 1250 | 2 | 91.3 | 4869 | +2.5 |

Minor C.: Minor Component
Sint Cnd.: Sintering Conditions
Tp: Temperature

TABLE 8

(x + y + x = 100)

| Sample No. | Main components (mol %) | | | | | Minor C. | | Sint. Cnd. | | DC | QF | $\tau_f$ |
|---|---|---|---|---|---|---|---|---|---|---|---|---|
| | x | y | z | α | β | | (wt %) | Tp (°C.) | Time (h) | ε | Q × f | (ppm/°C.) |
| 1 | 16.6 | 16.7 | 66.7 | 0.50 | 0.10 | CuO | 1.2 | 1250 | 2 | 84.6 | 3850 | −11.6 |
| 2 | 16.7 | 16.6 | 66.7 | 0.40 | 0.15 | ZnO | 1.3 | 1250 | 2 | 82.9 | 3008 | +11.2 |
| 3 | 16.6 | 16.7 | 66.7 | 0.45 | 0.20 | $Bi_2O_3$ | 1.1 | 1300 | 2 | 86.3 | 2786 | −7.3 |
| 4 | 16.7 | 16.6 | 66.7 | 0.45 | 0.20 | MnO | 1.4 | 1250 | 2 | 80.6 | 3125 | +8.5 |

Minor C.: Minor Component
Sint Cnd.: Sintering Conditions
Tp: Temperature

What is claimed is:

1. Dielectric ceramic compositions for microwave components comprising $Nd_2O_3$, $TiO_2$, a compound selected from the group consisting of BaO and $BaCO_3$, a compound selected from the group consisting of PbO and $Pb_3O_4$ and at least one compound selected from the group consisting of $CeO_2$ and $La_2O_3$ and having composition according to the formula (I):

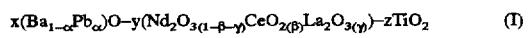

$$x(Ba_{1-\alpha}Pb_{\alpha})O-y(Nd_2O_{3(1-\beta-\gamma)}CeO_{2(\beta)}La_2O_{3(\gamma)})-zTiO_2 \qquad (I)$$

wherein, in mol %, $6 \leq x \leq 20$, $10 \leq y \leq 20$, $60 \leq z \leq 75$, $x+y+z=100$, $0<\alpha \leq 0.5$, $0 \leq \beta \leq 0.2$, $0 \leq \gamma \leq 0.2$ and $0<1-\beta-\gamma<1$.

2. Dielectric ceramic compositions for microwave components according to claim 1, wherein the composition comprises BaO.

3. Dielectric ceramic compositions for microwave components according to claim 1, wherein the composition comprises $BaCO_3$.

4. Dielectric ceramic compositions for microwave components according to claim 1, wherein the composition comprises PbO.

5. Dielectric ceramic compositions for microwave components according to claim 1, wherein the composition comprises $Pb_3O_4$.

6. Dielectric ceramic compositions for microwave components according to claim 1, wherein the compositions are sintered at a sintering temperature of 1250° to 1400° C. for 2 to 4 hours.

7. Dielectric ceramic compositions for microwave components according to claim 1, further comprising up to 1 wt. % of a compound selected from the group consisting of CuO, ZnO, $Bi_2O_3$ and MnO.

8. Dielectric ceramic compositions for microwave components according to claim 2, further comprising up to 1 wt. % of one or more compounds selected from the group consisting of CuO, ZnO, $Bi_2O_3$ and MnO.

9. Dielectric ceramic compositions for microwave components according to claim 3, further comprising up to 1 wt. % of one or more compounds selected from the group consisting of CuO, ZnO, $Bi_2O_3$ and MnO.

10. Dielectric ceramic compositions for microwave components according to claim 4, further comprising up to 1 wt. % of one or more compounds selected from the group consisting of CuO, ZnO, $Bi_2O_3$ and MnO.

11. Dielectric ceramic compositions for microwave components according to claim 5, further comprising up to 1 wt. % of one or more compounds selected from the group consisting of CuO, ZnO, $Bi_2O_3$ and MnO.

12. Dielectric ceramic compositions for microwave components according to claim 6, further comprising up to 1 wt. % of one or more compounds selected from the group consisting of CuO, ZnO, $Bi_2O_3$ and MnO.

* * * * *